Nov. 11, 1969  H. W. CRUMLEY  3,477,267
METHOD AND APPARATUS FOR MAKING BALLS FROM ROD STOCK
Filed Oct. 6, 1967  3 Sheets-Sheet 1
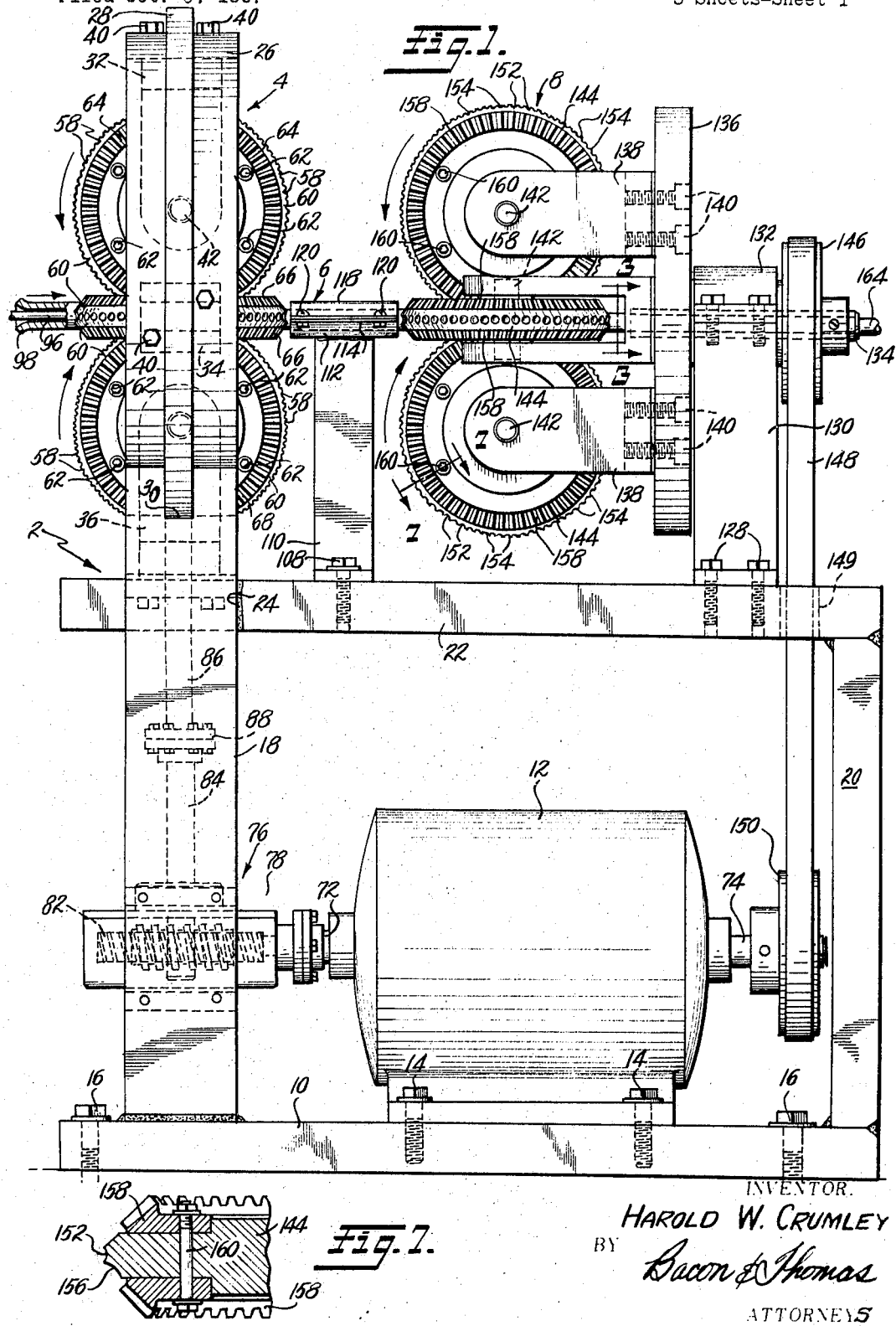
INVENTOR.
HAROLD W. CRUMLEY
BY Bacon & Thomas
ATTORNEYS

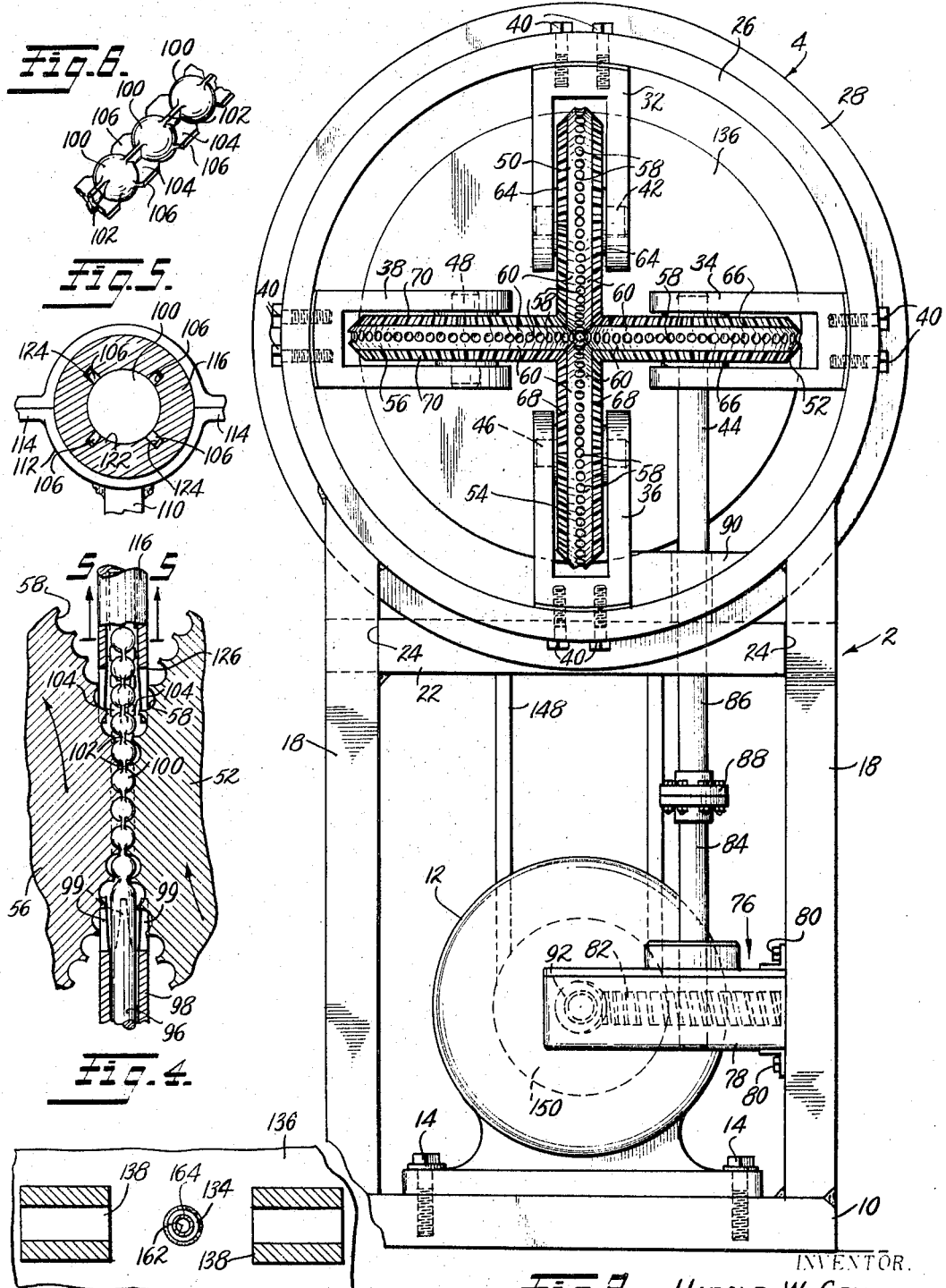

Nov. 11, 1969   H. W. CRUMLEY   3,477,267
METHOD AND APPARATUS FOR MAKING BALLS FROM ROD STOCK
Filed Oct. 6, 1967   3 Sheets-Sheet 3
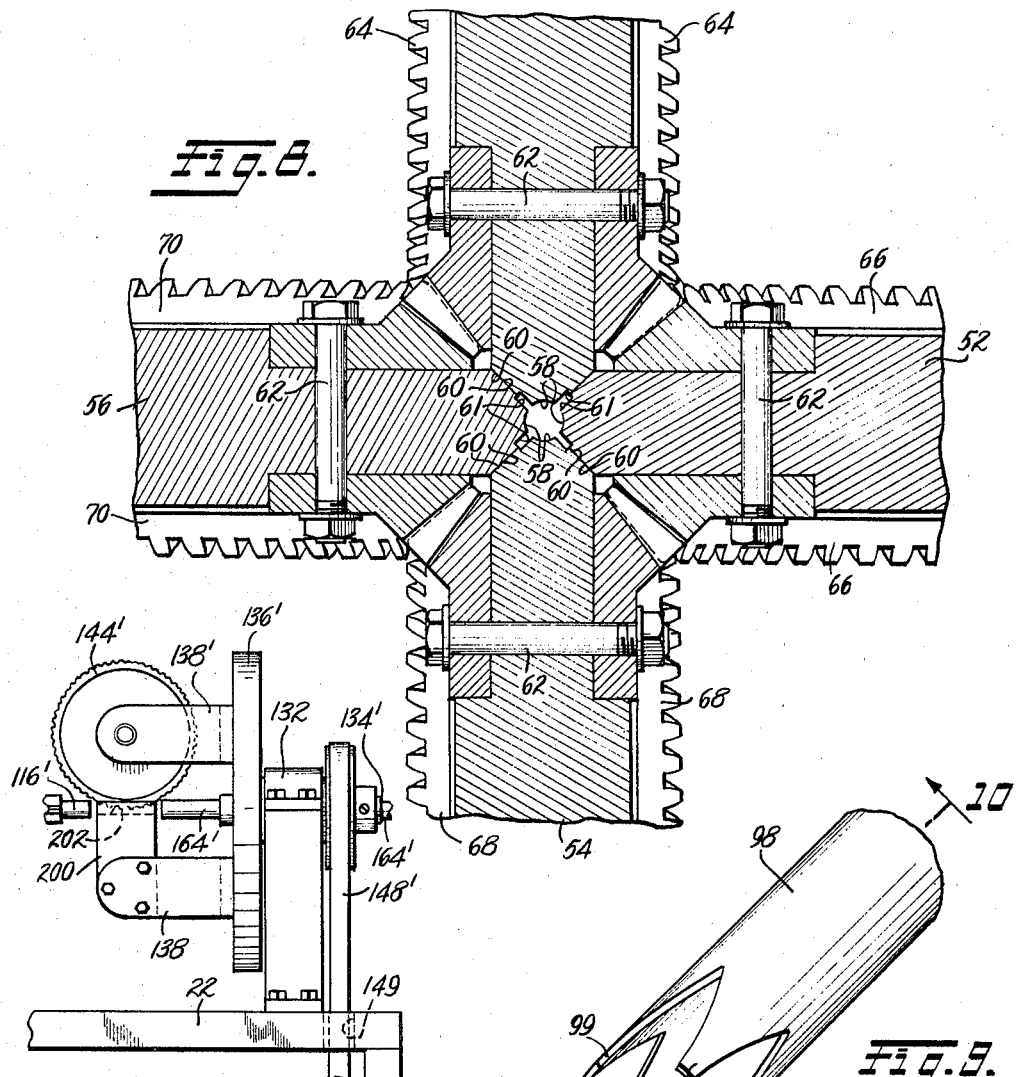
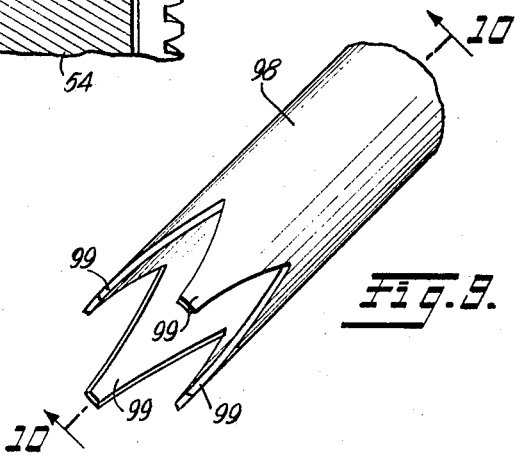
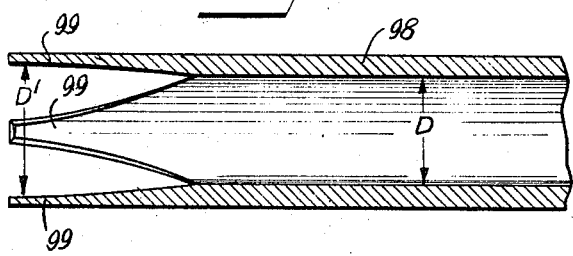
INVENTOR.
HAROLD W. CRUMLEY
BY
Bacon & Thomas
ATTORNEYS

United States Patent Office 3,477,267
Patented Nov. 11, 1969

3,477,267
METHOD AND APPARATUS FOR MAKING BALLS FROM ROD STOCK
Harold W. Crumley, 308 Love St.,
Johnson City, Tenn. 37601
Filed Oct. 6, 1967, Ser. No. 673,395
Int. Cl. B21d 7/024
U.S. Cl. 72—185                                       16 Claims

ABSTRACT OF THE DISCLOSURE

The method includes the step of forming a chain of balls from a piece of rod stock, the forming being done so that the balls are interconnected by linking portions on the axis of the stock, and by axially extending flashing that projects radially outwardly beyond the diameter of the balls. In the next step of the method the radially projecting flashing connecting the balls adjacent to the first ball of the chain is held, and the first ball is then separated from the next-succeeding ball by cutting away the connecting flashing, and by breaking through twisting the linking portion.

The apparatus includes a plurality of forging wheels arranged in confronting relationship about the rod stock, the axes of the forging wheels all lying in a common plane and the wheels being interconnected by ring gears mounted on the periphery of their opposite side faces. One of the forging wheels is drivingly connected to a motor, and said wheels form from rod stock a chain of balls connected as described above. From the forging wheels the chain of balls enters a transfer tube having axial grooves therein for receiving the flashing projections. Positioned at the discharge end of the transfer tube is a cutter assembly that receives the first ball of the chain, cuts away the flashing connecting it to the next-succeeding ball, and then twists the first ball relative to the other balls to break its connecting linking portion with the next-succeeding ball. In the preferred embodiment the cutter assembly includes a plurality of cutting wheels constructed and arranged like the forging wheels, and carried by a frame member that is rotatable to simultaneously revolve all the cutting wheels about the first ball. The meshed peripheral gears on the cutting wheels and the forging wheels maintain the respective wheels in register, and help prevent lateral deflection of the confronting portions. In addition, lateral displacement of the wheels is positively prevented by having confronting beveled surfaces on the periphery thereof in engagement.

BACKGROUND OF THE INVENTION

Field of the invention

This invention relates to a method and apparatus for manufacturing balls from rod stock, wherein the rod stock is formed by the simultaneous action of at least three forging wheels into a chain of interconnected balls, and the first ball of the chain successively is separated by a cutter assembly through both cutting and twisting action.

Description of the prior art

There have been machines devised to form balls through forging, utilizing various arrangements of forging tools. The balls are sometimes formed in a chain, after which they are separated by a conventional shear arrangement. Balls produced by such prior apparatus usually are not uniform, and shearing frequently gives uneven results from ball to ball. Further, prior machines normally involve many complicated elements, and are thus expensive to manufacture and maintain.

There is need for a ball making method and apparatus capable of producing precision formed balls rapidly and at minimum cost; the present invention satisfies that need.

SUMMARY OF THE INVENTION

In the present invention a chain of balls is formed from rod stock by a plurality of confronting, interconnected forging wheels, the balls of the chain being interconnected by linking portions on the axis of the stock, and by axially extending flashing. The flashing is an important feature of the invention, and is formed so that portions thereof project radially outwardly beyond the balls.

From the forging wheels the chain of balls passes into a transfer tube, the interior of which has axial grooves therein for receiving the projecting flashing portions. The grooves and the flashing cooperate to prevent the balls contained in the transfer tube from being rotated about the axis of the stock, which is important to the next step of the method.

A cutter assembly is positioned at the discharge end of the fixed transfer tube, and acts upon the first ball of the chain as such emerges from the tube. In the preferred embodiment hte cutter assembly includes a plurality of cutting wheels arranged in confronting relation about the axis of the stock, with their axes lying in a common plane. The cutting wheels are carried by a rotatable frame member, which is effective to revolve the rotatably-mounted cutting wheels about the axis of the stock.

When the first ball of the chain emerges from the transfer tube it is engaged by the revolving cutter assembly. Because the second and succeeding balls of the chain are fixed against rotation by the flashing received in the transfer tube grooves, in cooperation with the grip of the forging wheels on the stock, the first ball and the flashing connecting the first ball to the next-succeeding ball are at this time also held against rotation. The revolving cutter assembly first cuts away the flashing connecting the first and second balls. As the continuously moving chain of balls moves into the cutter assembly, the first ball of the chain is urged deeper between the confronting, rotating and revolving cutting wheels, until it is grasped by said revolving cutting wheels and is twisted about the axis of the shaft. This twisting action breaks the linking portion between the first and second balls, and the first ball is then passed away from the apparatus through a discharge tube.

A problem with the forging wheels and the cutting wheels is to maintain them in register, and to prevent lateral deflection of their confronting work surfaces. If any wheel slips out of register, or if deflection occurs, an imperfectly formed ball will result. The register problem is solved in the preferred embodiment of the present invention by utilizing at least three forging wheels and at least three cutting wheels, each wheel having a peripheral ring gear secured to each of the opposite faces thereof. The peripheral ring gears on each wheel are engaged with the confronting ring gears on the wheels on either side thereof, this arrangement being effective both to hold the wheels in register, and to help prevent lateral deflection thereof.

Lateral deflection is positively prevented for each set of wheels by having beveled peripheral surfaces on the wheels in engagement. The engaged surfaces prevent any lateral shifting, and ensure a well-formed product.

It is the principal object of this invention to provide a method and apparatus for making balls from rod stock, with a minimum of equipment and with maximum accuracy in configuration from ball to ball.

Another object is to provide a method and apparatus for efficiently and accurately separating the first ball from succeeding balls on a chain of interconnected balls.

A further object is to provide a revolving cutter assembly, effective to cut away the flashing and to break through twisting the material interconnecting the balls of a chain.

Still another object is to provide an assembly of at least three metal-working wheels arranged in confronting relationship with their axes lying in a common plane, and fitted with intermeshed ring gears arranged to keep the wheels in register and to help prevent lateral deflection thereof.

Yet another object is to provide an assembly of at least three metal-working wheels arranged in confronting relationship with their axes lying in a common plane, the wheels having confronting and engaged peripheral beveled surfaces thereon that function to prevent any lateral deflection and to aid in the initial alignment of the wheels.

Other objects and many of the attendant advantages of the invention will become apparent from the following description of the preferred embodiment, when taken in conjunction with the accompanying drawings.

BRIEF DESCRIPTION OF THE DRAWINGS

FIG. 1 is a side elevation view of the ball making apparatus of the invention;

FIG. 2 is an end elevation view, as viewed from the left of FIG. 1;

FIG. 3 is an enlarged fragmentary, vertical sectional view taken on the line 3—3 of FIG. 1, showing the arrangement of the ball discharge tube;

FIG. 4 is an enlarged fragmentary, horizontal sectional view through the forging wheels, with the upper and lower vertical forging wheels not shown for purposes of clarity;

FIG. 5 is an enlarged vertical, sectional view through the transfer tube, taken on the line 5—5 of FIG. 4;

FIG. 6 is an enlarged fragmentary, perspective view of a portion of a chain of balls;

FIG. 7 is an enlarged, fragmentary sectional view taken on the line 7—7 in FIG. 1, showing how the ring gears are mounted on the opposite faces of one of the cutting wheels, and showing the chip-discharging relieved portion on the trailing side of the cutting wheel;

FIG. 8 is a greatly enlarged fragmentary sectional view, showing the engaged beveled peripheral surfaces on the forging wheels, and the flash-forming recesses on said beveled surfaces;

FIG. 9 is a greatly enlarged fragmentary perspective view of the stock guide tube, showing the forging restrictor extensions thereon;

FIG. 10 is an axial section, taken on the line 10—10 of FIG. 9, showing the details of the forging restrictor end of the stock guide tube; and FIG. 11 is a fragmentary side elevational view, showing another embodiment of the cutter assembly utilizing one cutter wheel and a back-up anvil.

DESCRIPTION OF THE PREFERRED EMBODIMENT

Referring to FIGS. 1 and 2, the ball making apparatus of the preferred embodiment of the invention includes a supporting stand 2, upon which is carried at a first work station a forging wheel assembly 4 for forming a chain of interconnected balls from rod stock. Mounted behind the assembly 4 at a second station is a transfer tube assembly 6, and behind the assembly 6 at a third work station is located a cutter assembly 8 for separating the first ball of the chain from the next-succeeding ball.

The supporting stand 2 includes a base plate 10 upon which a motor 12 is mounted by bolts 14, the motor 12 being arranged to drive both the forging wheel assembly 4 and the cutter assembly 8. The base plate 10 is secured to suitable supporting structure by bolts 16, and a pair of vertical front legs 18 and a pair of vertical rear legs 20 are welded thereto. The upper ends of the rear legs 20 are welded to the undersurface of the rear corners of a rectangular plate 22, the front corners of the plate 22 being notched at 24 to receive the front legs 18. The legs 18 are welded to the plate 22, and project upwardly therefrom.

The forging wheel assembly 4 is carried by a cylindrical frame member 26, having an annular reinforcing rib 28 located centrally on its outer surface. The frame 26 rests on the upper ends of the front legs 18 and is welded thereto, said legs 18 each having a notch 30 therein to receive the rib 28. An opening is cut into the plate 22, to receive and provide access to the bottom of the cylindrical frame 26.

Mounted within the frame 26 are four radially-directed bifurcated brackets 32, 34, 36 and 38, said brackets being spaced 90° apart in a common vertical plane and being secured to the frame 26 by bolts 40. Each of the brackets 32–38 carries a supporting shaft 42, 44, 46 and 48, respectively, said shafts all lying in a common vertical plane and serving to rotatably mount circular forging wheels 50, 50, 52, 54 and 56, respectively.

The forging wheels 50, 52, and 56 are thus mounted in confronting relationship, and the periphery of each has a plurality of spaced forming indentations 58 therein. Referring in particular FIG. 8, the periphery of each wheel 50–56 on both sides of the row of indentations 58 is beveled to provide a pair of 45° surfaces 60, the outer two-thirds of the confronting beveled surfaces being in engagement. The inner one-third of each beveled surface 60 has a flow recess 61 cut therein, the confronting recesses 61 being utilized to form the flashing on the chain of balls, which flashing is in turn necessary to the carrying out of the separation process according to the invention.

Secured to the opposite faces of the forging wheel 50 at the periphery thereof by bolts 62 are bevel ring gears 64. Similar ring gears 66, 68 and 70 are mounted on the forging wheels 52, 54 and 56, respectively, and the confronting ring gears are in mesh so that if one of the forging wheels is turned, the remained will be turned simultaneously and at an identical speed. In addition to drivingly connecting the forging wheels 50–56, the ring gears 64–70 serve two other important functions.

The forging wheels 50–56 are intended to act simultaneously on a piece of rod stock passed therebetween, each of the indentations 58 forming but a portion of the completed ball. If an accurately formed ball is to be produced, then the forging wheels 50–56 must be in precise register with each other. Such register is maintained by the ring gears 64–70, which because of their position at the peripheral forming surfaces of the forging wheels 50–56, ensure against even the smallest degree of relative slippage between the forging wheels.

The position of the ring gears 64–70 at the peripheral forming surfaces of the forging wheels 50–56 also helps to eliminate any tendency of the wheels to displace or deflect laterally, in the direction of the axles 42–48. The intermeshed beveled ring gear 64–70 tend to prevent any such deflection, and thus they help assure the accuracy of the formed ball.

The ring gears 64–70, however, only secondarily prevent lateral deflection of the forging wheels 50–56. The primary means for preventing such deflection comprises the engaged portions of the peripheral beveled surfaces 60. By mounting the confronting wheels 50–56 with the confronting surfaces 60 in engagement, nearly all possibility of lateral displacement is eliminated; the ring gears 64–70 thus serve mainly to back-up or reinforce the deflection-preventing action of the engaged beveled surfaces 60.

The beveled surfaces 60 also serve to properly align the four forging wheels 50–56 during mounting thereof. When the various surfaces 60 are all properly engaged with their mates, true alignment of the forming recesses 58 for producing a round ball is assured.

The invention is not limited to an arrangement of four forging wheels, and indeed three or six could be equally well employed. At least three wheels are necessary, if the wheels are to be interconnected at their periphery by the ring gears. By utilizing peripheral ring gears in the manner shown and described, nearly any number of forging wheels, within the limits of practicality, can be employed.

The motor 12 includes a pair of output shafts 72 and 74, one at each end of the motor. Mounted on one of the vertical legs 18 in alignment with the shaft 72 is a reduction drive gear assembly 76, including a housing 78 secured by bolts 80 to the leg 18 and carrying a drive gear 82 mounted on the lower end of a shaft 84. The shaft 84 is coupled to a projecting portion 86 of the shaft 44 by a coupling 88, and the shaft 44 is keyed to the forging wheel 52 and extends through a suitable bushing 90 carried by the cylindrical frame 26.

The housing 78 also contains a worm gear 92 in mesh with the drive gear 82, and coupled to the motor shaft 72 by a coupling 94. Thus, when the motor 12 is energized the forging wheel 52 will be rotated, and with it through the ring gears 64–70 the other forging wheels 50, 54 and 56.

The direction of rotation of the forging wheels 50–56 is indicated in FIG. 1, and rod stock 96 is fed thereto from a stock guide tube 98. The forward end of the guide tube 98 projects deep between the forging wheels 50–56, and is designed to aid in the forging process. Referring to FIGS. 4, 9 and 10, the tube 98 has four wedge-shaped forging restrictor extensions 99 formed thereon, which are shaped to extend into the forging wheels 50–56 to nearly the point at which the beveled surfaces 60 on the confronting wheels engage. The diameter D of the tube rearwardly of the forging extensions 99 is just slightly larger than that of the stock 96, but such diameter gradually increases in the region of the extensions 99 until at the tip of said extensions the diameter D' corresponds to that of the balls 100 formed on the stock 96 by the forging wheels.

As shown in FIG. 4, the rod stock 96 advances toward the forging wheels 50–56 until it is engaged by the indentations 58, whereupon it is compressed until the metal begins to flow. Initial contact with the stock occurs severals degrees in front of the plane containing the axes 42–48, and the restrictor extensions 99 help to confine the flowing metal during the period just after initial contact so that it flows into the recesses 58. The increasing diameter of the stock guide tube 98 accommodates the increased diameter of the worked stock material.

The formation of each ball 100 is completed by filling the recesses 58 just before the ball reaches the plane of the axes 42–48, the balls 100 being connected on the axis of the stock by linking portions 102. Further advance of the stock results in the flow of metal into the recesses 61, to form radially extending flashing 104 that also serves to interconnect the balls 100.

The forging wheels 50–56, and the recesses 61 thereon, are designed and positioned to deliberately form the flashing 104 so that such projects beyond the diameter of the balls 100, as shown in FIGS. 5 and 6. The radially projecting portions 106 of the flashing 104 are utilized to help secure the chains of balls against rotation, as will be described.

From the forging wheel assembly 4 the chain of balls 100 passes on the second work station where the transfer tube assembly 6 is located. Secured to the plate 22 by bolts 108 is a vertical standard 110, to the upper end of which is welded a semi-cylindrical tube section 112 provided with lateral flanges 114. Received on the tube section 112 is a transfer tube 116, the tube 116 being secured against both axial and rotational movement by a flanged semi-cylindrical tube section 118 and bolts 120.

The transfer tube 116 has a bore 122 therethrough of a diameter just slightly larger than that of the balls 100, the sidewall of said bore having four axially extending grooves 124 therein for receiving the four flashing projections 106. The number of flashing projections 106, and hence the number of grooves 124 needed, is determined by the number of forging wheels; for example, if six rather than four wheels are employed there would be six flashing projections, and six grooves would be needed.

The tube 116 is aligned on the axis of the stock 96, and the receiving end 126 thereof is shaped similarly to the forward end of the stock guide tube 98 so that it can be placed deep between the forging wheels 50–56. Because the transfer tube 116 is clamped against rotation, it is evident that the flashing projections 106 will be held by the grooves 124 to prevent any rotation of balls 100 contained within the tube. The grip of the forging wheels 50–56 on the stock also helps prevent rotation thereof.

From the transfer tube assembly 6 the balls 100 are transferred to the third work station, where the cutter assembly 8 is positioned. Secured to the plate 22 by bolts 128 is a standard 130, on the upper end of which is supported a bearing unit 132. A shaft 134 is carried by the bearing unit 132, and mounted on the forward end thereof is a circular frame plate 136 to which four bifurcated brackets 138 are secured by bolts 140. The brackets 138 are equally spaced, and each mounts a shaft 142, the shafts 142 all lying in a common vertical plane.

Mounted on the shafts 142 are four cutting wheels 144, the wheels 144 lying in confronting relationship like the forging wheels 50–56. The cutting wheels 144 are free to rotate on their shafts 142 in the direction indicated by the arrows in FIG. 1, and in addition all four cutting wheels are revolved about the axis of the rod stock 96 when the frame member 136 is rotated. The shaft 134 lies on the axes of the stock 96 and the transfer tube 116, and has a pulley 146 mounted on its outer end. The pulley 146 is connected by a belt 148 to a pulley 150 mounted on the motor shaft 74, so that when the motor 12 is operating the entire cutter assembly 8 will be revolved clockwise, as viewed in FIG. 2. The plate 22 has an opening 149 therein for passage of the belt 148.

The cutting wheels 144, as shown in FIGS. 1 and 7, have spaced indentations 152 on the periphery thereof separated by cutting teeth 154. The trailing edge 156 of each wheel 144 is relieved to provide clearance for chips removed by the teeth 154 to fall away. A pair of beveled ring gears 158 is mounted by bolts 160 on each cutting wheel 144, the ring gears 158 functioning like the ring gears 64–70 to drivingly connect the wheels 144, and to maintain said cutting wheels in register and prevent lateral deflection thereof.

The discharge end of the transfer tube 116 projects into the space between the confronting cutting wheels 144, so that only one ball 100 is supplied at a time to the cutter assembly 8. The shaft 134 has a bore 162 therethrough, within which is secured a ball discharge tube 164. The receiving end of the tube 164 is shaped like the end 126 of the transfer tube 116, and projects deep between the cutting wheels 144 to pick up individual balls 100 as such are separated from the chain of connected balls. The outlet end of the tube 164 discharges beyond the end of the shaft 134, and individual balls 100 discharged therefrom are passed to other processing equipment.

The ball-making apparatus of the invention functions as follows: Initially, the motor 12 is activated to drive the forging wheel assembly 4, and to revolve the cutter assembly 8. The rod stock 96 is then fed into the forging wheels 50–56, through the stock guide tube 98, and as the connected balls 100 are formed they enter the transfer tube 116. The chain of balls 100 is moved at a constant rate of speed from station to station by the driven forging wheel assembly 4.

The discharge end of the transfer tube 116 is positioned to feed one ball 100 at a time to the cutter assembly 8, the balls 100 rearwardly of the first ball of the chain being held against rotation by the interacting flashing portions 106 and the grooves 124, assisted by the grip of the forging wheels 50–56 on the stock. When the first ball 100 of the constantly moving chain reaches the cutter assembly 8, it registers with the first set of teeth 154 that will not let it pass. The revolving cutting teeth 154 on the wheels 144 then proceed to cut away the flashing connecting the first ball 100 with the next-succeeding ball, in the manner of a generating fly cutter. As the first ball 100 moves deeper between the cutting wheels 144 the latter are rotated about their axes and the ball enters the indentations 152. When the ball is nearly centered between the revolving cutting wheels 144, it is grasped by the indentations 152 and then is twisted by the wheels, thus breaking its connecting linking portion 102 with the next-succeeding ball. The latter ball then becomes the first ball of the chain, and the process continues successively and at a constant rate of speed. It is understood, of course, that more than one ball 100 is worked on at a time by the cutting wheels 144, as the closely spaced balls move theretoward.

As each first ball 100 is separated from the next-succeeding ball, it enters the discharge tube 164 and is carried away. The individual balls are then subjected to whatever finishing treatment is necessary to render them suitable for their intended use, such as for ball bearings. As with the forging wheel assembly 4, a greater or lesser number of cutting wheels 144 can be utilized.

Essentially, the method of the invention includes the following steps:

(1) Feeding the rod stock 96 continuously along a given path;

(2) Forming said stock 96 at a first station along said path into a chain of balls 100 connected to each other on the axis of the stock by linking portions 102, and also connected to each other by axially extending flashing 104, portions 106 of the flashing 104 projecting substantially beyond the outer diameter of the balls 100;

(3) Restraining at a second station along said path the projecting portions 106 of the flashing 104, to restrain the balls 100 rearwardly from and adjacent the first ball of the chain against rotating about the axis of the stock 96; and (4) Separating in succession the first ball of the chain from the next-succeeding ball at a third station along said path, by engaging therewith the revolving cutter assembly 8.

Other features of the method are apparent from the disclosure and the drawings.

The construction of the cutter assembly 8 can be varied, without departing from the generating fly cutter concept thereof. For example, a lesser number of cutting wheel, such as two, can be utilized. Another embodiment, utilizing but a single cutting wheel, is shown in FIG. 11.

Referring to FIG. 11, a circular frame member 136' is mounted on a shaft 134', and is driven by a belt 148'. The member 136' has a pair of diametrically opposed brackets 138' mounted thereon, one of which mounts a cutting wheel 144' identical in construction to the cutting wheels 144', except for the absence of the bevel ring gears 158.

The other bracket 138' has an anvil 200 bolted thereto, containing a shallow groove 202 in its top surface. A chain of balls is fed to the assembly in FIG. 11 through a guide tube 116', and separated balls are removed through a discharge tube 164'. The assembly of FIG. 11 functions as a generating fly cutter in a manner similar to the cutter assembly 8, except that because there is only one cutting wheel 144' rather than four, the member 136' must be revolved at a considerably higher speed than the member 136.

Obviously, many other modifications and variations of the invention are possible in the light of the above teachings. It is therefore to be understood that within the scope of the appended claims the invention may be practiced otherwise than as shown and described.

I claim:

1. The method of making balls from rod stock, comprising the steps of: feeding said stock continuously along a given path; forming said stock at a first station along said path into a chain of balls connected to each other on the axis of said stock by linking portions, and also connected to each other by axially extending flashing, portions of said flashing projecting substantially beyond the outer diameter of said balls; restraining at a second station along said path the portions of said flashing projecting beyond the diameter of said balls, to restrain the balls rearwardly from and adjacent the first ball of said chain againt rotating about the axis of said stock; and separating in succession the first ball of said chain from the next succeeding ball at a third station along said path, by engaging therewith cutter means arranged to revolve about the axis of said stock.

2. The method of making balls from rod stock, comprising the steps of: feeding said stock continuously along a given path; forming said stock at a first station along said path into a chain of balls connected to each other on the axis of said stock by linking portions, and also connected to each other by axially extending flashing, portions of said flashing projecting substantially beyond the outer diameter of said balls; restraining at a second station along said path the portions of said flashing projecting beyond the diameter of said balls, to restrain the balls rearwardly from and adjacent the first ball of said chain against rotating about the axis of said stock; and separating in succession the first ball of said chain from the next-succeeding ball at a third station along said path by engaging therewith cutter means arranged to revolve about the axis of said stock, said revolving cutter means cutting away the flashing connecting said first ball with said next-succeeding ball, and breaking through twisting the linking portion connecting said first ball and said next-succeeding ball.

3. The method as recited in claim 2, wherein said forming step comprises applying forging means to said stock from a plurality of directions all lying in a common plane.

4. The method as recited in claim 3, wherein forging means is applied to said stock simultaneously from at least three directions.

5. Apparatus for making balls from rod stock, comprising: means at a first station for forming said stock into a chain of balls connected to each other on the axis of the stock by linking portions, and also connected to each other by axially extending flashing, said forming means forming said flashing so that portions thereof project radially outwardly beyond the diameter of said balls; means at a second station disposed after said first station for restraining the portions of said flashing projecting beyond the diameter of said balls to thereby restrain the balls rearwardly from and adjacent the first ball of said chain against rotating about the axis of said stock, said restraining means providing no restraint on the movement of said chain of balls along the axis of said stock through said station; and cutter means mounted to revolve about the axis of said stock, and operable to separate in succession the first ball of said chain from the next-succeeding ball.

6. Apparatus as recited in claim 5, wherein said forming means comprises at least three forging wheels arranged about the axis of said stock in confronting relation, the axes of said forging wheels lying in a common plane and the confronting portions of said wheels when taken together extending about the full circumference of said stock, said confronting portions having recesses centrally thereon for forming said balls and said flashing, and including beveled surfaces on the opposite sides of said recesses, the beveled surfaces on adjacent wheels being in engagement to positively prevent lateral deflections of said forging wheels; and means for rotating said forging wheels about their respective axes, rotation of said forging wheels being effective to move said stock through said three stations.

7. Apparatus as recited in claim 6, wherein said means for rotating said forging wheels includes: gear means secured to the opposite faces of each forging wheel at the periphery thereof, the gear means on each forging wheel being in mesh with the gear means on the confronting face of the forging wheels on both sides thereof, whereby by rotating one of said forging wheels all of said forging wheels are simultaneously rotated, said engaged gear means also functioning to maintain said forging wheels in register and to help restrain said wheels against lateral deflection; and drive means connected with one of said forging wheels.

8. Apparatus as recited in claim 5, wherein said restraining means comprises a transfer tube mounted after said forming means in alignment with the axis of said stock, said transfer tube having a bore therethrough of a diameter slightly greater than the diameter of said balls, the sidewall of said bore having axially extending grooves therein of a size to receive said projecting portions of said flashing.

9. Apparatus as recited in claim 5, wherein said cutter means comprises: at least one cutting wheel arranged relative to the axis of said stock so that said wheel lies in the plane of said axis and the periphery of said wheel engages a chain of forged balls moving along said axis; frame means carrying said cutting wheel, said frame means being mounted for rotation about the axis of said stock, so that said cutting wheel can be revolved about the axis of said stock; means mounted on said frame means to confront said cutting wheel for supporting said stock while said cutting wheel is acting thereon; and means for revolving said frame means, said revolving cutting wheel being rotated by the chain of balls as such is fed thereto, and being effective in cooperation with said confronting supporting means to cut away the flashing interconnecting said first ball and the next-succeeding ball, and to break the linking portion connecting said first ball and said next-succeeding ball.

10. Apparatus as recited in claim 9, wherein the periphery of said cutting wheel has a plurality of spaced recesses therein for partially receiving the balls of said chain of balls, said recesses being separated by cutting teeth for removing said flashing.

11. Apparatus for making balls from rod stock, comprising: means at a first station for forming said bar stock into a chain of balls connected to each other on the axis of said stock by linking portions, and also connected to each other by axially extending flashing, said forming means forming said flashing so that portions thereof project outwardly beyond the diameter of said balls; a transfer tube positioned at a second station after said first station and aligned with the axis of said stock, said transfer tube having a bore therethrough of a diameter slightly larger than that of said balls, the sidewall of said bore having axially extending grooves therein for receiving the radially projecting portions of said axially extending flashing, whereby said grooves and said flashing cooperate to prevent rotation of balls contained within said transfer tube about the axis of said stock; and cutter means positioned at a third station after said second station to receive the first ball of said chain as such leaves said transfer tube, said cutter means being mounted to revolve about the axis of said stock, and being effective to: (1) cut away the flashing connecting said first ball with the next-succeeding ball; and (2) grasp and twist said first ball relative to said next-succeeding ball, to break the linking portion connecting said two balls; and means for revolving said cutter means.

12. Apparatus as recited in claim 11, wherein said cutter means comprises: at least three cutting wheels arranged about the axis of said stock in confronting relationship and with their axes lying in a common plane, the confronting peripheral surfaces of said wheels when taken together extending about substantially the entire circumference of said first ball; frame means for carrying said cutting wheels, said frame means being mounted for rotation about the axis of said stock, whereby when said frame means is rotated said cutting wheels will be simultaneously revolved about said first ball, the confronting peripheral surfaces of said cutting wheels having spaced cutting teeth thereon for cutting away said flashing when said cutting wheels are revolving and while said first ball is moving axially of said stock toward said cutting wheels, and gripping recesses between said teeth for grasping said first ball when such has moved into a centered position relative to said confronting surfaces.

13. Apparatus as recited in claim 12, including gear means secured to the opposite faces of each cutting wheel at the periphery thereof, the gear means on each wheel being in mesh with the gear means on the confronting faces of the adjacent wheels, said gear means maintaining said wheels in register.

14. A cutter assembly for separating the first ball from a chain of interconnected balls, said balls being joined by a connecting linking portion on the axis of said chain and by radially extending flashing, said cutter assembly comprising: a cutting wheel having spaced recesses on the periphery thereof for partially receiving the first balls of said chain, said recesses being separated by cutting teeth; a frame member mounted to revolve about the axis of said chain of balls, and having said cutting wheel mounted thereon, said cutting wheel being rotatably mounted to lie in the same plane as the axis of said chain of balls and so that when said frame is revolved said cutting teeth will be effective to remove the flashing interconnecting said balls; means carried by said frame member confronting said cutting wheel, and arranged to support said chain of balls while such are being acted upon by said cutting wheel; means for revolving said frame member; and means for moving said chain of balls into said cutter assembly and for holding said chain against rotation, the teeth on said revolving cutting wheel being effective to cut away the flashing connecting the first ball of said chain to the next-succeeding ball as said first ball moves toward said cutting wheel, and said revolving cutting wheel and supporting means subsequently grasping and twisting said first ball to break the linking portion between it and said next-succeeding ball.

15. A cutter assembly as recited in claim 14, wherein said supporting means comprises an anvil.

16. A cutter assembly as recited in claim 14, wherein said supporting means comprises at least one additional cutting wheel, said cutting wheels being mounted in confronting relationship with their axes lying in a common plane.

References Cited

UNITED STATES PATENTS

| | | | |
|---|---|---|---|
| 596,899 | 1/1898 | Merriam | 72—186 |
| 1,108,272 | 8/1914 | Strathern | 72—194 |
| 2,700,909 | 2/1955 | Gronemeyer | 72—71 |
| 2,801,556 | 8/1957 | Gronemeyer | 72—186 |

CHARLES W. LANHAM, Primary Examiner

LOWELL A. LARSON, Assistant Examiner

U.S. Cl. X.R.

29—148.4; 72—194; 225—96.5